United States Patent
Dombrowski et al.

(10) Patent No.: US 9,904,364 B2
(45) Date of Patent: Feb. 27, 2018

(54) OPERATOR CONTROL DEVICE FOR A TECHNICAL SYSTEM

(71) Applicants: Sascha Dombrowski, Nürnberg (DE); Oliver Joehnssen, Erlangen (DE)

(72) Inventors: Sascha Dombrowski, Nürnberg (DE); Oliver Joehnssen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 358 days.

(21) Appl. No.: 13/972,631

(22) Filed: Aug. 21, 2013

(65) Prior Publication Data

US 2014/0059427 A1 Feb. 27, 2014

(30) Foreign Application Priority Data

Aug. 27, 2012 (EP) ..................................... 12181895

(51) Int. Cl.
*G06F 3/01* (2006.01)
*G06F 3/0484* (2013.01)
*G06F 3/0488* (2013.01)

(52) U.S. Cl.
CPC .......... *G06F 3/016* (2013.01); *G06F 3/04847* (2013.01); *G06F 3/04886* (2013.01); *G06F 2203/014* (2013.01)

(58) Field of Classification Search
CPC ... G06F 3/016; G06F 2203/014; G06F 3/0488
See application file for complete search history.

(56) References Cited

U.S. PATENT DOCUMENTS 7,292,227 B2 11/2007 Fukumoto et al.
9,143,343 B2 * 9/2015 Kim ..................... H04L 12/2809
(Continued)

FOREIGN PATENT DOCUMENTS

CN 102349040 2/2012
CN 102349041 2/2012
(Continued)

OTHER PUBLICATIONS

Office Action dated Mar. 3, 2017 which issued in the corresponding Chinese Patent Application No. 201310376381.9.
(Continued)

*Primary Examiner* — Linh K Pham
(74) *Attorney, Agent, or Firm* — Cozen O'Connor

(57) ABSTRACT

An operator control device for a technical system includes at least one touch-sensitive operator control panel which produces, based on electrical vibration, an adjustable and operator perceptible frictional force when the operator moves his finger on the surface thereof, wherein operator control elements are provided within the at least one operator control panel, the frictional force is produced and an operator command is generated by the operator touching a respective operator control element with his finger, at least some of the operator commands are control commands for the technical system, the number of operator control elements includes at least one first operator control element, and where the frictional force produced when a respective first operator control element is touched is lower than the frictional force produced in response to a touch in a region of the at least one operator control panel bordering the respective first operator control element.

17 Claims, 2 Drawing Sheets

(56) References Cited

U.S. PATENT DOCUMENTS

| | | | |
|---|---|---|---|
| 2005/0092187 A1* | 5/2005 | Lamartino | A22C 7/0023 99/353 |
| 2006/0209037 A1 | 9/2006 | Wang et al. | |
| 2008/0066627 A1* | 3/2008 | Lamartino | A22C 7/0023 99/447 |
| 2008/0148843 A1* | 6/2008 | Drummond | G05D 23/1854 73/276 |
| 2009/0007017 A1* | 1/2009 | Anzures | G06F 3/04883 715/835 |
| 2009/0199580 A1* | 8/2009 | Lyon | G05D 23/1932 62/157 |
| 2010/0231367 A1* | 9/2010 | Cruz-Hernandez | G06F 3/016 340/407.2 |
| 2010/0267424 A1* | 10/2010 | Kim | G06F 3/016 455/566 |
| 2011/0187658 A1* | 8/2011 | Song | G06F 3/041 345/173 |
| 2011/0248916 A1 | 10/2011 | Griffin et al. | |
| 2011/0282547 A1* | 11/2011 | Hoshi | F01P 11/16 701/36 |
| 2011/0285666 A1* | 11/2011 | Poupyrev | G06F 3/045 345/174 |
| 2011/0296356 A1* | 12/2011 | Chaudhri | G06F 3/04883 715/863 |
| 2012/0218200 A1* | 8/2012 | Glazer | G06F 3/04883 345/173 |
| 2013/0057509 A1* | 3/2013 | Cruz-Hernandez | G06F 3/044 345/174 |
| 2013/0314355 A1* | 11/2013 | Inata | G06F 1/1626 345/173 |
| 2015/0054773 A1* | 2/2015 | Jiang | G06F 3/016 345/174 |

FOREIGN PATENT DOCUMENTS

| | | |
|---|---|---|
| CN | 102368197 | 3/2012 |
| WO | WO 2010/105006 A1 | 9/2010 |

OTHER PUBLICATIONS

Olivier Bau, Ivan Poupyrev, Ali Israr, Chris Harrison. 2010. TeslaTouch: Electrovibration for Touch Surfaces. In Proceedings of the 23nd annual ACM symposium on User interface software and technology (UIST '10). ACM, New York, NY, USA, 283-292.; 2010; US.

* cited by examiner

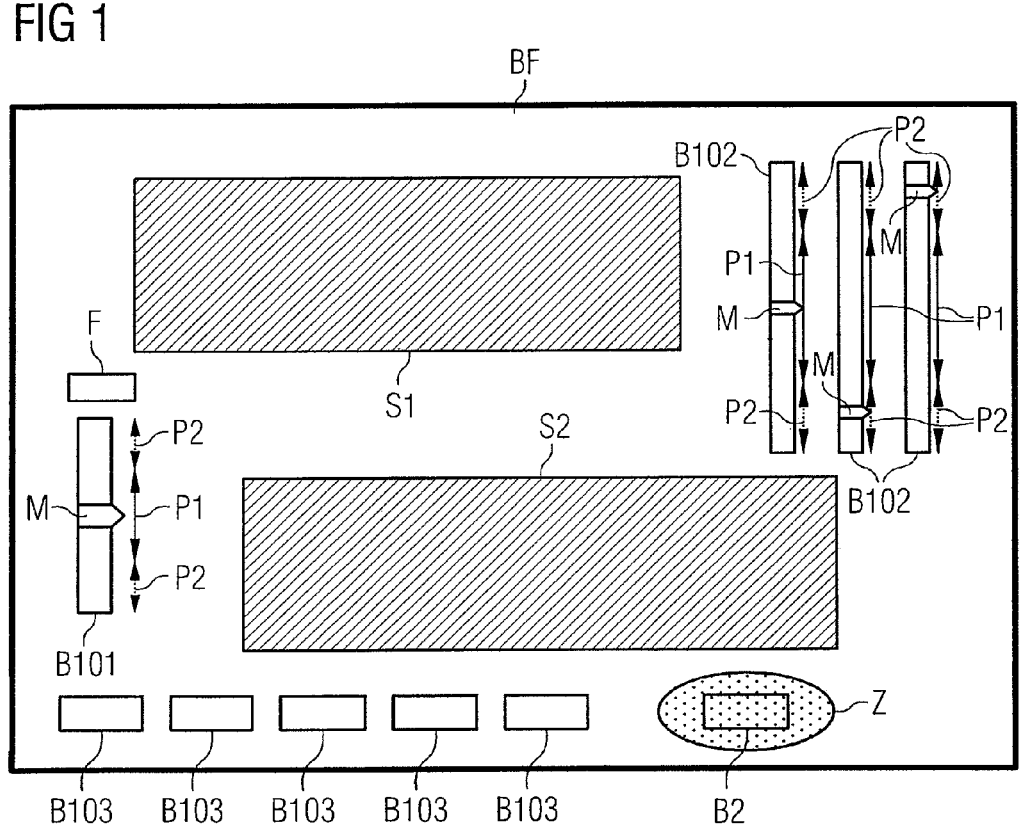

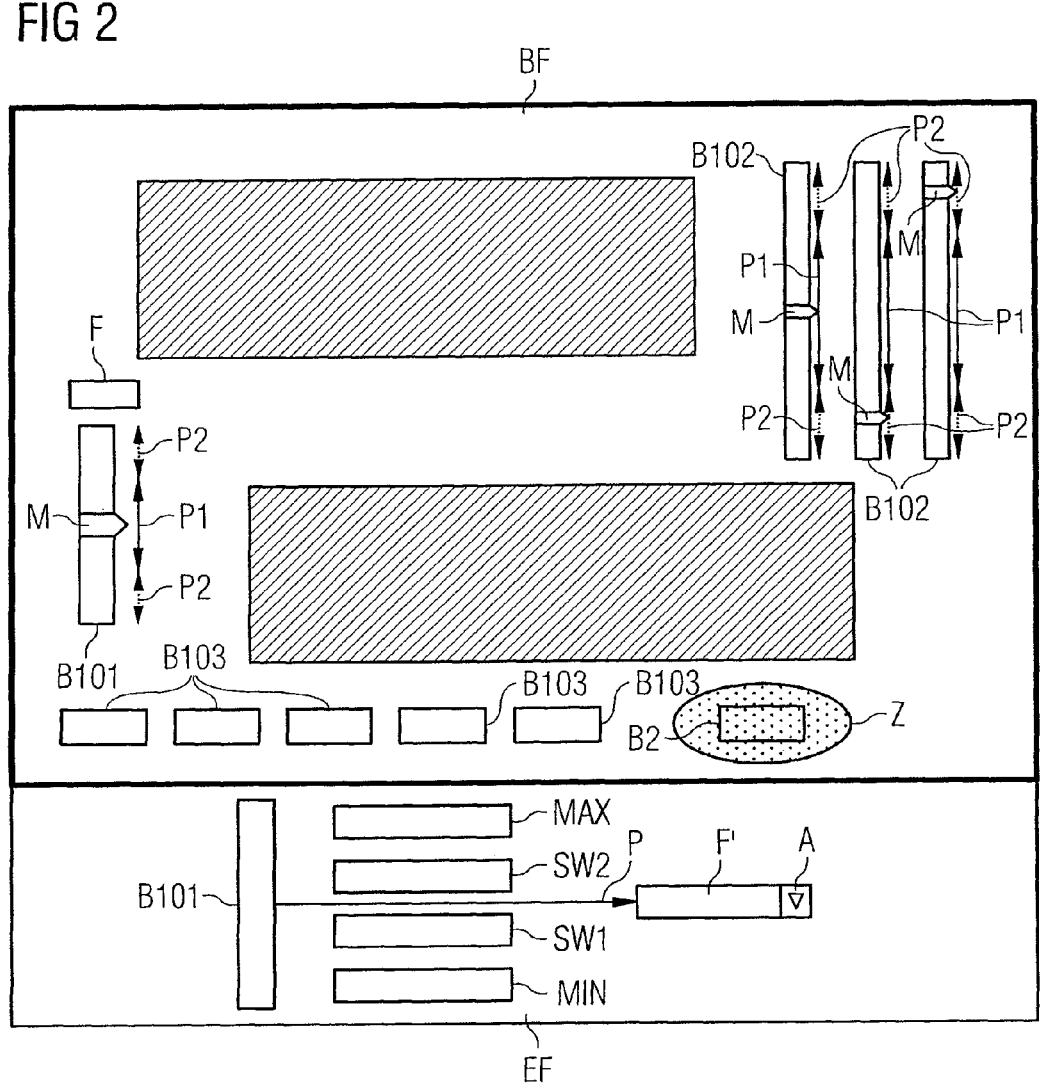

OPERATOR CONTROL DEVICE FOR A TECHNICAL SYSTEM

BACKGROUND OF THE INVENTION

1. Field of the Invention

The invention relates to an operator control device for a technical system.

2. Description of the Related Art

Touch-sensitive operator control panels in the form of touchscreen displays for operating a technical system, such as an industrial plant or section thereof, are known in which the operator enters operator commands by touching the surface of the display. The problem of such displays is that the operator is mostly not looking at the control panel but at the technical system being operated (i.e., a semi-blind operation). However, in order to adjust corresponding parameters of the technical system, it is necessary to be looking simultaneously at the operator control panel in order not to inadvertently slip off the button being actuated or set the value range of a parameter to a value that is too large.

To avoid operating errors, the conventional practice for critical operating procedures is to dispense with touch-sensitive operator control panels and continue to use a conventional keyboard device. Such keyboard devices are more expensive, larger and therefore less manageable than touch-sensitive operator control panels.

U.S. Pub. No. 2010/0231367 A1 describes an operator control device comprising a touch-sensitive operator control panel, contact with which causes a haptic effect to be produced, via actuators, which moves the surface of the operator control panel mechanically.

U.S. Pub. No. 2011/0248916 A1 discloses an operator control device having a display, contact with which causes tactile feedback to be produced via piezoelectric actuators.

WO 2010/105006 A1 describes an operator control device having electromechanical actuators for generating a haptic effect when a touch-sensitive surface of the device is touched.

U.S. Pat. No. 7,292,227 B2 discloses an electronic device having an oscillating actuator that generates vibrations when an input to a touch-sensitive operator control panel of the device is detected.

SUMMARY OF THE INVENTION

It is therefore an object of the invention is to provide an operator control device for a technical system that comprises at least one touch-sensitive operator control panel while preventing operating errors on the operator control panel.

This and other objects and advantages are achieved by providing an operator control device configured to operate a technical system comprising at least one touch-sensitive operator control panel that generates, based on electrical vibration, an adjustable and operator-perceptible friction or more precisely frictional force when the operator moves at least one finger on its surface. In the at least one operator control panel, a number of operator control elements are provided, where when the operator touches the respective operator control element with at least one finger and moves his finger, the frictional force is produced and an operator command is generated. At least some of the operator commands are control commands for the technical system.

Touch-sensitive operator control panels based on electrical vibration are known per se from the prior art. An AC voltage is applied to an electrode overlaid with an insulating layer, where a frictional force or friction is produced in response to an operator's touch and finger movement. In this way, the operator-perceptible roughness or smoothness of the operator control panel or more specifically of the operator control elements can be adjusted. In the following description, touching is always taken to mean contact with an operator's finger. It must also be taken into account that touching of the operator control panel even without the operator-desired movement on the surface of the operator control panel results in a frictional force, as every touch invariably involves a slight finger movement that causes the friction.

In accordance with the invention, an operator control panel based on electrical vibration is used that also allows movements to be detected. For this purpose, a conventional touchscreen can be used that has been enhanced to provide the functionality of varying the friction via electrical vibration. The touchscreen can be, e.g., a capacitive touchscreen or an optical touchscreen or even a multitouch screen. In a particularly preferred embodiment, the operator control panel is based on the display, also known under the term "TeslaTouch", described in the publication: Olivier Bau, Ivan Poupyrev, Ali Israr, Chris Harrison. 2010. TeslaTouch: Electrovibration for Touch Surfaces. In Proceedings of the 23rd Annual ACM Symposium on User Interface Software and Technology (UIST '10). ACM, New York, N.Y., USA, pages 283-292 ("Olivier et al.").

The operator control elements used in the operator control device in accordance with the invention comprise one or more first operator control elements, where the generated frictional force of a respective first operator control element in response to contact and associated finger movement is lower than the frictional force generated in response to contact and associated finger movement in a region of the at least one operator control panel that is adjacent to the first operator control element and in particular completely surrounds the respective first operator control element. The variable frictional force feature can be achieved by a plurality of electrodes provided in the operator control panel that are each supplied with a separately adjustable AC voltage.

It is inventively ensured that if the operator's finger (inadvertently) moves off the corresponding operator control element, this is haptically communicated to the operator by increasing the friction. The advantage of this is that the operator can operate a machine even without looking at the touch-sensitive operator control panel. In particular, operating errors are prevented, because the operator is haptically informed if his finger is slipping off the operator control element. The operator control device in accordance with the invention can be implemented in a simple manner without additional sensors via a touch-sensitive operator control panel or touchscreen. In addition, the strength and type of haptic feedback based on electrical vibration can be adjusted by varying the corresponding frequency or strength of the AC voltage applied. Among other things, sensations such as ease of movement, strong deceleration or sticking can be produced on the operator control panel or even the feeling of vibration can be conveyed.

The operator control device in accordance with the invention is used in particular for operating a technical system in the form of an industrial automation installation or part of an automation installation, such as a corresponding machine in the automation installation. The automation installation can be a production automation or process automation facility. During the operation of industrial automation installations, the problem often occurs that the operator is not looking at the operator control panel but at the installation itself.

In a particularly preferred embodiment, the operator control device comprises at least one display panel for displaying information relating to the technical system. The at least one display panel preferably comprises at least one of the operator control elements of the at least one operator control panel. In particular, the at least one operator control panel can correspond to the at least one display panel. In a preferred embodiment, a single operator control panel is provided that contains both corresponding operator control elements and provides information about the technical system, such as parameter values set.

In another particularly preferred embodiment, at least one of the first operator control elements is a control slider and/or dial that generates an operator command by operator finger contact and movement along a predefined path on the least one operator control panel and in particular adjusts values of at least one parameter of the technical system. The path can be implemented, for example, in the form of a bar or ring or part of a ring. Operator finger contact and movement along the predefined path preferably occurs by moving a marker along the predefined path, where the marker indicates the current position along the predefined path. This intuitively provides the operator with feedback about his control action. For example, if parameters are adjusted by the slider or dial, the parameter value set can be indicated via the current position of the marker.

In a particularly preferred embodiment of the above described slider and/or dial, the frictional force is increased if operator finger contact and movement begins to leave the predefined path and enter a region adjacent to the predefined path in a direction perpendicular to the predefined path. In this way, if the finger slips off the control region of the slider and/or dial, this is indicated to the operator simply and quickly.

In a particularly preferred embodiment of the slider and/or dial, the frictional force produced by operator finger contact and movement along the predefined path is varied as a function of the position of contact along the predefined path. In this way, the operator's position along the path can be haptically communicated to the operator. The frictional force then becomes greater if contact and movement along the predefined path causes at least one parameter of the technical system to be set to a value on the edge of or outside a setpoint range. By this means the operator is haptically informed if the setting involves leaving a predefined setpoint range.

Instead of or in addition to sliders and/or dials, first operator control elements can also be implemented as control buttons via which an operator command is generated by tapping them.

In another embodiment of the operator control device, the number of operator control elements also includes at least one second operator control element, where a respective second operator control element is contained in a zone of the at least one operator control panel. In response to operator finger contact, this zone produces, at least in the edge region of the zone, an increased frictional force compared to a region of the at least one operator control panel that is adjacent to the zone and in particular completely surrounds the zone. In this way, the operator can be informed when his finger is moving in the direction of a corresponding second operator control element. In particular, this enables operator control elements having safety-critical functions to be protected from accidental activation. If necessary, operator control elements can also be provided in the operator control device in accordance with the invention that implement both the functionality of a first and the functionality of a second operator control element.

In another particularly preferred embodiment of the operator control device, the frictional force produced by the operator control element is changed temporarily if an operator command is generated or fails to be generated via an operator control element of at least some of the operator control elements. The temporary change in the frictional force is preferably provided such that the operator feels a vibration. This provides the operator with suitable tactile feedback about successful or unsuccessful operation of an operator control element.

In another embodiment, the operator control device can be switched to a setting mode in which the frictional force produced in response to touching an operator control element and/or a touch-generated frictional force in a region bordering the operator control element and in particular completely surrounding the operator control element can be set for at least some of the operator control elements. This provides the operator with a flexible way of defining the functionality of corresponding operator control elements. In setting mode, the operator can preferably set whether a particular operator control element functions as a first and/or as a second operator control element.

In another preferred embodiment, in setting mode it is also possible to specify the above described setpoint range, departure from which causes the frictional force due to operator finger contact and movement along the predefined path to be increased.

In another embodiment, the operator control device recognizes predetermined control gestures that an operator performs via corresponding contacts using at least one finger on the at least one operator control panel. Here, the frictional force produced when a control gesture is performed is increased if the gesture is impermissible according to defined criteria, e.g., because the gesture is not supported by the operator control device or is executed in a region of the operator control panel in which such gestures are not possible.

In addition to providing the above-described operator control device, it is also an object of the invention to provide a technical system which incorporates the operator control device in accordance with the invention or rather at least one preferred embodiment of the operator control device in accordance with disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention will now be described in detail with reference to the accompanying drawings, in which:

FIG. 1 schematically illustrates the operator control panel of an embodiment of the operator control device in accordance with the invention; and FIG. 2 shows the operator control panel of FIG. 1 in setting mode.

DETAILED DESCRIPTION OF THE PREFERRED EMBODIMENTS

The invention will now be described based on an operator control device for part of an industrial installation, such as a cooling system, where particular parameters of the installation can be changed and the installation therefore controlled. For example, the temperature in a cooling system can be adjusted or other control parameters can be varied accordingly.

The operator control device used as part of the invention comprises an operator control panel based on the electrical vibration technology already described in the introduction, where the touch-sensitive surface of the operator control panel comprises electrodes with overlying insulation layer, where an AC voltage is applied to the electrodes in each case. As a result, friction or rather a frictional force that can be varied in a suitable manner by varying the amplitude or frequency of the AC voltages is generated in response to movement of an operator's finger on the operator control panel. The operator is thus provided with tactile feedback when touching the operator control panel. In the operator control panel according to the invention, electrical vibration technology is combined with per se known touchscreen or touch display technology whereby touches applied to the operator control panel are detected and converted into corresponding commands. In the presently described embodiment, an optical multitouch display is used for this purpose in which diffuse infrared light radiates from the underside of the operator control panel to the operating surface, touching of the display being detected by an infrared camera. The display, also known as "TeslaTouch", which is described in Olivier et al. is preferably used as the operator control panel.

FIG. 1 shows an embodiment of an operator control device in accordance with the invention, having an operator control panel BF which is part of a larger touch display based on electrical vibration. In the operator control panel, information concerning the installation to be operated is displayed in particular areas, schematically indicated by the hatched areas S1 and S2. Additionally provided are a plurality of operator control elements B101, B102, B103 and B2, which can be touched by the operator of the control panel BF as a way of entering commands and in particular adjusting parameters of the industrial installation.

In the embodiment of the operator control panel BF depicted in FIG. 1, operator control elements B101 and B102 are provided that represent examples of first operator control elements. The operator control element B101 is provided in the left-hand part of the operator control panel BF and is configured as a kind of slider. A vertically running bar is provided, within which a marker M is located that can be moved up and down by touch, whereby a value of a parameter of the technical system, such as the temperature of a temperature circuit, can be increased and reduced respectively. The marker has a point that points to a scale (not shown), thereby indicating the parameter value set. Above the operator control element B101, a field F is also provided in which the corresponding parameter value is reproduced in text form. To adjust the parameter value, the operator touches the marker M with a finger and moves it up or down to the required parameter value. When the marker is released, it remains in the position selected by the operator and the corresponding parameter of the technical installation is set to the selected value.

The operator control element B101 is characterized in that it provides the operator with feedback if his finger slips off the operator control element while the parameter is being set. Such slippage occurs in particular during operation of industrial installations where the operator is not looking continuously at the operator control panel when setting the parameters, but is always looking at the installation to be controlled. To provide feedback for this eventuality, the friction or rather frictional force in the entire area surrounding the bar of the operator control panel B101 is increased, based on the electrical vibration principle, compared to the frictional force within the bar, so that increased friction is conveyed to the operator if his finger moves outside the operator control element and he thus receives the information that his finger is no longer within the operator control element.

The operator control element B101 additionally has a varying frictional force inside its bar to indicate thereby to the operator that he is setting the corresponding parameter to a value outside a setpoint range. In FIG. 1, the setpoint range is indicated by the double arrow P1 and the regions of the parameter values outside the setpoint range by adjacent double arrows P2. The arrows are not part of the operator control panel illustrated. The friction conveyed by electrical vibration is set such that it is higher in the regions P2 than in the regions P1. Therefore, if the operator moves the marker M from the region P1 into the regions P2, this will be communicated to him by a stronger friction, so that he is made aware that he is leaving the setpoint range of the parameter. The frictional force inside the bar is nevertheless lower at each point than the frictional force in the area around the bar, so that, in the event of movement out of the bar and in particular in the horizontal direction, it is always conveyed to the operation via the friction that he has slipped off the operator control element.

The setting of the frictional force via electrical vibration is known per se and is performed by adjusting the amplitude or frequency of AC voltages applied to electrodes in the operator control panel. If required, the sensation of an easily sliding or slippery surface can also be conveyed to the user. In particular, the frictional force is greatly reduced in the corresponding setpoint range P1, so that here it is particularly easy for the operator to move the marker.

In addition to the operator control element B101, three other operator control elements B102 are shown in the embodiment in FIG. 1 by way of example in the right-hand region of the display. These operator control elements are of similar configuration to the operator control element B101, i.e., they are again implemented as sliders with a marker M, where slipping off the slider is conveyed by an increased frictional force in the area around the bars of the operator control elements and, in addition, a setpoint range is indicated by a reduction in friction inside the bar. Similarly to the operator control element B101, the double arrows P1 and P2 have been used to denote the setpoint range and the region outside the setpoint range, respectively.

In addition to the operator control elements B101 and B102 in the form of sliders, the operator control panel BF also comprises a plurality of operator control elements B103 in the lower part of the operator control panel BF which constitute further examples of first operator control elements. In contrast to the operator control elements B101 and B102, these operator control elements B103 are implemented as control buttons which initiate a corresponding control action when touched. As the touch also involves a slight movement of the operator's finger, a predetermined friction is also always communicated to the operator via electrical vibration.

Similarly to the operator control elements B101 and B102, the friction in the area surrounding the edge of the corresponding operator control elements B103 is correspondingly increased, which again ensures that slipping off the corresponding control buttons is conveyed to the operator. The control buttons B103 can assume different functionalities depending on requirements. In particular, starting or stopping of the corresponding technical installation can be ordered by touching the control buttons. Functions relating to the configuration of the operator control panel itself can likewise be implemented, such as display modes can be changed or a help function called up.

In the presently described embodiment, the operator control elements B103 are also configured such that activation of the corresponding control button is conveyed to the operator, based on the electrical vibration principle. Here, the friction is changed temporarily when the corresponding the operator control element is touched such that the operator feels a vibration, thereby providing him with feedback about the successful activation of the button.

In the embodiment of the operator control panel depicted in FIG. 1, another control button B2 is additionally provided that represents an example of a second operator control element. This button is used to activate a critical function, such as complete switch-off of the operator control device. For this purpose, it is advisable for it to be suitably communicated to the operator that he is about to execute a safety-critical function. Consequently, a zone Z is provided which is indicated as an elliptical dotted area in FIG. 1 and is not part of the operator control panel shown. The zone contains the operator control element B2 and has a higher friction, again generated via electrical vibration, than the area outside the zone. The operator is thereby made aware that his finger is slipping, e.g., accidentally into the vicinity of the control button B2, thus warning him of the risk of inadvertent activation of a safety-critical function.

FIG. 2 show the operator control panel BF from FIG. 1 in setting mode (often termed "engineering system") which can be suitably activated by the operator, such as via a corresponding operator control element B103. Also shown on the display in addition to the operator control panel BF is a field EF via which the functionality of corresponding operator control elements can be set or changed, as the case may be. In the representation in FIG. 2, the operator control element B101 has been selected for setting via the setting field EF. The operator is displayed a representation of the bar of the operator control element B101 in the area EF.

The operator now has various possibilities for making settings for the operator control element. Via the field F' to which an arrow P points, he can specify via the selector element A whether the operator control element is to be a first operator control element or a second operator control element. When the selector element is activated, the corresponding selectable options are displayed in a dropdown list. The option selected then appears in the field F'. If the operator control element is specified as a first operator control element via the selector element A, the friction around the bar is increased, thereby providing the above described feedback about slipping off the control element. If, on the other hand, the operator control element is specified as a second operator control element, the operator is made aware of slipping onto the operator control element. This is done by defining a zone Z similarly to the operator control element B2, where the zone has a higher friction than the area around the zone.

In the FIG. 2 embodiment, the above-described slipping-off feedback functionality has been selected via the selector element A. It is then possible for the user to additionally define a corresponding setpoint range for the parameter to be set via the operator control element. In particular, in the field MIN the operator can enter the smallest parameter value, and in the field MAX the largest parameter value that is to be set via the operator control element B101. Via the field SW1 he also defines the lower limit of the setpoint range and via SW2 the upper limit of the setpoint range by entering appropriate parameter values. As a result, in the bar of the operator control element B101, the friction in the setpoint range is then reduced compared to the rest of the bar. The corresponding entering of values to the fields MAX, MIN, SW1 or SW2 can be carried out in a suitable manner, such as via a separate input device in the form of a keyboard or via a separate input field displayable on the screen.

If necessary, further settings can also be performed via the setting field EF. For example, it can be specified whether or not feedback is provided via the above-described vibration in the event of successful operation of the corresponding operator control element. Here, additional checkboxes can be provided for setting other characteristics of the operator control element. In another embodiment, operator control elements can also be provided in the operator control device that are disposed separately from the operator control panel BF and implemented, for example, as individual buttons. These separate operator control elements are of identical design to the respective operator control elements B101, B102, B103 or B2 and disposed in a single small touch display, again employing electrical vibration, provided solely for the corresponding operator control element.

The above described embodiments of the operator control device offer a number of advantages. In particular, an operator can be suitably made aware of slipping off and possible also onto corresponding operator control elements via the setting of the friction based on the electrical vibration principle. Moreover, the operator can be provided with haptic feedback when leaving a setpoint range during parameter setting. In addition, successful activation of an operator control element can be indicated to the operator via tactile feedback, such as via a vibration.

In the operator control device according to the invention, separate hardware for generating haptic or tactile feedback, such as corresponding haptic actuators, can be dispensed with, thereby reducing the production costs of the operator control device. In addition, conventional tactile actuators have the disadvantage that longer-term seal tightness cannot be guaranteed for the control unit through their use, as the vibration occurring causes, e.g., seals to break (become brittle, etc.) over time, which means that they cannot be used for industrial grade equipment (e.g., in compliance with ingress protection rating 65 or IP65).

The operator control device according to the invention improves the operation of a touch-sensitive operator control panel and thereby reduces the frequency of operator error. In addition, an operator control panel based on electrical vibration is simple to manufacture, thereby reducing production costs. In particular, no separate hardware control elements, such as handwheels or pushbuttons, need to be provided. Using the operator control device, different types of feedback based on electrical vibration can be implemented. In particular, a rough surface can be produced by increasing the friction or a smooth surface by reducing the friction and if required a vibration can also be generated.

Thus, while there have shown and described, pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operator control device of an industrial automation installation comprising a cooling system, comprising:
at least one touch-sensitive operator control panel which produces, based on electrical vibration, an adjustable and operator-perceptible frictional force when the operator moves at least one finger on the surface thereof; and a plurality of operator control elements, the frictional force being produced and an operator command being generated in the at least one touch-sensitive operator control panel by the operator touching a respective operator control element with at least one finger and associated linger movement; wherein at least some operator commands are control commands for the industrial automation installation comprising the cooling system; wherein the plurality of operator control elements comprise at least one first operator control element; wherein the frictional force produced when a respective first operator control element is touched and an associated linger movement occurs is lower than the frictional force produced in response to a touch and associated. finger movement in a region of the at least one touch-sensitive operator control panel bordering and completely surrounding a respective first operator control element; and wherein the plurality of operator control elements comprise at least one second operator control element; wherein a respective second operator control element of the plurality of operator control elements is contained in a zone of the at least one operator control panel which produces a higher frictional force at least in an edge region of the zone than in an area of the at least one touch-sensitive operator control panel bordering the zone in response to operator fineer contact.

2. The operator control device as claimed in claim 1, wherein the region of the at least one touch-sensitive operator control panel bordering the respective first operator control element completely surrounds the respective first operator control element.

3. The operator control device as claimed in claim 1, wherein the operator control device comprises at least one display panel for displaying information relating to the industrial automation installation comprising the cooling system.

4. The operator control device as claimed in claim 3, wherein the at least one display panel comprises at least one the operator control element of the plurality of operator control elements of the at least one touch-sensitive operator control panel.

5. The operator control device as claimed in claim 1, wherein at least one of the at least one first operator control element is at least one of a control slider and dial which, in response to operator finger contact and movement along a predefined path on the at least one touch-sensitive operator control panel, generates an operator command and in particular adjusts values of at least one parameter of the technical system.

6. The operator control device as claimed in claim 5, wherein the operator finger contact and movement along the predefined path occurs by moving a marker along the predefined path, and wherein the marker indicates a current position along the predefined path.

7. The operator control device as claimed in claim 5, wherein the frictional force is increased if contact of the finger of the operator moves from the predefined path to an area bordering to the predefined path in a direction perpendicular to the predefined path.

8. The operator control device as claimed in claim 1, wherein at least one of the at least one first operator control element is at least one of a control slider and dial which, in response to operator finger contact and movement along a predefined path on the at least one touch-sensitive operator control panel, generates an operator command and adjusts values of at least one parameter of the technical system.

9. The operator control device as claimed in claim 8, wherein the frictional force is increased if contact of the finger of the operator moves from the predefined path to an area bordering to the predefined path in a direction perpendicular to the predefined path.

10. The operator control device as claimed in claim 8, wherein the frictional force produced by the operator finger contact and movement along the predefined path is varied as a function of a position of the operator finger contact along the predefined path; wherein the frictional force increases if contact and movement along the predefined path causes at least one parameter of the technical system to be set to a value on an edge of a setpoint range or outside the setpoint range.

11. The operator control device as claimed in claim 1, wherein the at least one first operator control elements comprises control buttons via which an operator command is generated by a touch comprising tapping.

12. The operator control device as claimed in claim 1, wherein, when an operator command is generated or fails to be generated via an operator control element of at least some of the plurality of operator control elements, the frictional force produced by the operator control element is temporarily changed; and wherein the temporary change of the frictional force is provided such that an operator experiences a vibration.

13. The operator control device as claimed in claim 1, wherein the operator control device is switchable to a setting mode in which, for at least some of the plurality of operator control elements; at least one of the frictional force produced in response to touching the respective operator control element and a frictional force produced in an area bordering the respective operator control element is set by an operator.

14. The operator control device as claimed in claim 13, wherein whether a respective operator control element of the plurality of operator control elements functions as at least one of a first operator and a second operator control element is settable during a setting mode.

15. The operator control device as claimed in claim 14, wherein the frictional force produced by operator finger contact and movement along a predefined path is varied as a function of a position of the operator finger contact along the predefined path;
- wherein the frictional force increases if contact and movement along the predefined path causes at least one parameter of the industrial automation installation comprising the cooling system to be set to a value on an edge of a setpoint range or outside the setpoint range; and
- wherein the setpoint range is settable, departure from the setpoint range causing the frictional force to be increased in response to the operator finger contact and movement along the predefined path.

16. The operator control device as claimed in claim 13, wherein the frictional force produced by operator finger contact and movement along a predefined path is varied as a function of a position of the operator finger contact along the predefined path;
- wherein the frictional force increases if contact and movement along the predefined path causes at least one parameter of the industrial automation installation comprising the cooling system to be set to a value on an edge of a setpoint range or outside the setpoint range;
- wherein the setpoint range is settable, departure from the setpoint range causing the frictional force to be increased in response to the operator finger contact and movement along the predefined path.

17. The operator control device as claimed in claim 1, wherein predetermined control gestures performed by an operator using at least one finger on the at least one operator control panel is recognizable by the operator control device; wherein the frictional force produced in response to the operator control gesture is reduced if the gesture is impermissible.

* * * * *